(12) United States Patent
Aranda Gutierrez

(10) Patent No.: US 8,856,274 B2
(45) Date of Patent: Oct. 7, 2014

(54) METHOD FOR DISTRIBUTING OF ROUTING INFORMATION FOR REDUNDANT CONNECTIONS

(75) Inventor: Pedro Andrés Aranda Gutierrez, Madrid (ES)

(73) Assignee: Telefonica, S.A., Madrid (ES)

( * ) Notice: Subject to any disclaimer, the term of this patent is extended or adjusted under 35 U.S.C. 154(b) by 260 days.

(21) Appl. No.: 13/516,111

(22) PCT Filed: Dec. 15, 2009

(86) PCT No.: PCT/ES2009/070586
§ 371 (c)(1),
(2), (4) Date: Aug. 27, 2012

(87) PCT Pub. No.: WO2011/073459
PCT Pub. Date: Jun. 23, 2011

(65) Prior Publication Data
US 2012/0324044 A1     Dec. 20, 2012

(51) Int. Cl.
*G06F 15/16* (2006.01)
*H04L 12/715* (2013.01)
*H04L 12/741* (2013.01)
*H04L 12/913* (2013.01)
*H04W 80/04* (2009.01)
*H04L 12/46* (2006.01)
*H04L 29/12* (2006.01)
*H04W 8/08* (2009.01)
*H04L 12/707* (2013.01)
*H04L 12/911* (2013.01)

(52) U.S. Cl.
CPC ............... *H04L 45/46* (2013.01); *H04L 45/54* (2013.01); *H04L 47/724* (2013.01); *H04W 80/04* (2013.01); *H04L 45/04* (2013.01); *H04L 12/4633* (2013.01); *H04L 29/12915* (2013.01); *H04W 8/085* (2013.01); *H04L 45/22* (2013.01); *H04L 45/24* (2013.01); *H04L 47/825* (2013.01)
USPC ........... 709/217; 370/235; 370/351; 709/223; 709/224

(58) Field of Classification Search
CPC ... H04L 45/04; H04L 47/724; H04L 12/4633; H04L 47/825; H04L 29/12915; H04L 45/22; H04W 80/04; H04W 8/085
USPC ................... 709/217, 223, 224; 370/235, 351
See application file for complete search history.

(56) References Cited

U.S. PATENT DOCUMENTS 6,584,093 B1 *  6/2003  Salama et al. ................ 370/351
7,286,479 B2 * 10/2007  Bragg ........................... 370/238

(Continued)

OTHER PUBLICATIONS

P. Marques, RFC 2545—Use of BGP-4 Multiprotocol Extensions for IPv6 Inter-Domain Routing, The Internet Engineering Task Force, Mar. 1999; 5 pages.*

(Continued)

*Primary Examiner* — Oleg Survillo
*Assistant Examiner* — Michael Cirone
(74) *Attorney, Agent, or Firm* — Sughrue Mion, PLLC

(57) ABSTRACT

The present invention relates to a method for distributing routing information for redundant connection. The method is implemented in hierarchical IPv6 Internet protocol (IP) networks comprising a plurality of different autonomous systems (AS) which use a border gateway routing protocol (BGP-4) to communicate, which protocol does not allow routing sessions to be established automatically, which prevents multi-provider services from being created. The method of the invention makes it possible to create multi-provider services in the networks discussed above by using the BGP-4 protocol established by the current standards and technologies. This makes it possible to increase services offered by the providers.

2 Claims, 3 Drawing Sheets

(56) References Cited

U.S. PATENT DOCUMENTS

| | | |
|---|---|---|
| 8,199,642 B2* | 6/2012 | Vasseur et al. ............... 370/230 |
| 2006/0164995 A1* | 7/2006 | Djernaes et al. ............. 370/238 |
| 2010/0046531 A1* | 2/2010 | Louati et al. ................. 370/401 |

OTHER PUBLICATIONS

F. Baker, RFC 3175—Aggregation of RSVP for IPv4 and IPv6 Reservations, The Internet Engineering Task Force, Sep. 2001; 72 pages.*

Y. Rekhter, RFC 4271—A Border Gateway Protocol 4 (BGP-4), The Internet Engineering Task Force, Jan. 2006; 104 pages.*

H. Soliman, RFC 5380—Hierarchical Mobile IPv6 (HMIPv6) Mobility Management, The Internet Engineering Task Force, Oct. 2008; 25 pages.*

Ki-Il Kim et al., "Novel Sheme for Eficient and Salable Multihoming Support in IPv6", Communication Systems, 2002. ICCS 2002. The 8th International Conference on Nov. 25-28, 2002. Piscataway, NJ, USA, IEEE. vol. 2, pp. 656-660.

Bagnulo M. et al. "Multi-Homing Tunnel Broker". Euromicro Conference, 2004. Proceedings. 30th Rennes, France Aug. 31-Sep. 3, 2004, Piscataway, NJ, USA, IEEE. pp. 282-289.

Da-Hye Choi et al. "Distributed IPv6 Multihoming Support". 9th Asia-Pacific Conference on Communications (IEEE Cat. No. 03EX732). 2003. IEEE. Piscataway, NJ, USA. vol. 3 pp. 1097-1101.

Written Opinion for PCT/ES2009/070586.

* cited by examiner

METHOD FOR DISTRIBUTING OF ROUTING INFORMATION FOR REDUNDANT CONNECTIONS

OBJECT OF THE PRESENT INVENTION

The object of the method of the invention is to provide multi-provider connections in hierarchical networks using the IPv6 version of the Internet Protocol (IP).

BACKGROUND OF THE INVENTION

Packet-switched networks identify their nodes through a node address. The switching nodes transfer the data packets from a source to destinations identified by their respective node addresses. To that end, they use the routing information which can both be calculated centrally for the entire network, and calculated independently and distributed by each of the nodes in the packet-switched network. Distributed routing is used for example in IP networks. To converge into a stable network configuration, the nodes exchange their network view with their neighbors by means of the routing protocols. This view includes information about the topology (i.e., links between node) and the nodes served by a router (i.e., the address space or set of adjacent addresses working by means of a router).

The Internet network is an extremely complex network interconnecting known territories such as autonomous systems (AS). An AS is defined as a set of nodes configured with operation patterns common and consistent with relation to a set of networks. The routing protocols in the IP networks can be classified by their scope. Inner routing protocols, such as routing information protocol (RIP), open shortest path first protocol (OSPF) etc. are used within the scope of an AS. Outer routing protocols are used for exchanging information between the different AS. Currently, the only outer routing protocol known is the Border Gateway Protocol (BGP-4). To cause redundancy, many of the AS and the current Internet are connected to another two or more AS. This practice is known as multi-provider in the AS level.

Given the huge commercial success that the Internet has had, it has lead to the addresses from the IPv4 version being exhausted. To overcome this problem and to preserve the point-to-point principle established in Internet, a new version of the IP protocol, which is known as version IPv6, is being introduced and used in the network. This new version increases the available address space by means of increasing the length of the IP address field from 32 to 128 bits. The BGP-4 protocol is used in the IPv4 networks and it has been extended to deal with the IPv6 protocol version.

The addressing space of the current Internet IPv4 is not structured, which leads to a series of adverse effects such as the excessive growth of the number of routes in the Internet core routers. Therefore the IPv6 proposes a hierarchical delegation of the addressing space, in which the AS of IPv6 route the traffic following a simple rule: sending the traffic to the address space that was delegated to the bottom AS, lower hierarchical level, or to the top AS provider, higher hierarchical level, from which the address space was received. The IPv6 specifications do not provide the possibility of any other type of routing, which means that in the level of the AS, the Internet IPv6 consists of a series of routing trees connected to a complete mesh of high level domains. A large enough address space is assigned to the top AS providers, which is partially used by them and partially by their AS customers (located in a lower hierarchical level) to which the address space is delegated by means of aggregation, once they have their own customers. All the AS pass an input with their aggregated address space assigned to their top AS providers and inform their AS customers that they are the Internet default route. Thus the routing tables are kept small by aggregation, as is depicted in FIG. 1.

In order to prevent these drawbacks the Internet Engineering Task Force (IETF) has produced a detailed architecture for connecting the sites with IPv6 to more than one AS provider, and the AS multi-provider level has not been addressed.

This means that the level of the AS multi-provider for IPv6 as proposed by the IETF is only anticipated in the end customer level, whether the latter is a node (i.e., an ADSL router) or a site (i.e., a network of nodes with a single connection point), determining the following drawbacks:

1. Leaving all the technical responsibility of the multi-provider to the end user of the AS. In the case of a bigger organization, the task is carried out by the network operation centre or by the IT department at the expense of a bigger and highly qualified team.
2. Using technologically advanced solutions which are not user friendly and are not feasible for retail services: a multi-provider service provider with end customers would have to handle a large amount of end customer devices with multiple addresses, and can no longer wait for the end customers to understand the implications of having multiple IP addresses assigned to their devices.
3. Jeopardizing a significant part of the business of the wholesale IP service providers (such as TIWS (Telefónica complete international services), representing that any loss of an AS against a competing provider will virtually be lost forever, given that switching between providers means connectivity loss and longer transition periods.

The multi-provider in the AS level and the Internet IPv6 is technically possible, but it has still not been provided by the standards because it may be a source of serious problems, and would break the address delegation principle as has been described.

Furthermore, a potential source of uncontrolled growth of the routing tables of the core network of the Internet IPv6 would arise if the AS which depend on another AS were allowed to propagate their routing information to a bottom AS. The size of the routing table is a key factor both for the cost and for the performance of a router. With 128-bit address space instead of 32 bit, the size of the routing table could reduce the amount of physical memory which can be handled by the processors of the routers. The handling of the data structures of the size necessary to overcome this situation could be unfeasible due to the algorithm response time necessary for going through the routing tables.

Another solution to the problem described consists of implementing the BGP based on labeling and filtering which depend on the BGP communities which are optional BGP-4 attributes. The communities have a local meaning for a specific AS and are used for labeling announcements from the BGP-4. This labeling is then used through filters determining whether or not an announcement advances towards the routing process. This implementation proposal does not allow the AS multi-provider to have a single address space. The complete proposal requires the addressing to be delegated by the top AS.

Additionally, the AS multi-provider must label its prefixes with a label given in the form of a BGP community which must be accepted and correctly filtered by all the AS. This involves a consistent deployment strategy with uniform software editions in all the equipment of Internet IPv6. Currently there is a small set of well known communities which are uniformly accepted by all the sellers. Adding new well known values to this list is unlikely since the IETF will not back up the application in a near future.

Therefore, the implementation must take place as an agreement between providers and the risk of configuration errors cannot be disregarded.

Another solution which has been proposed consists of performing the virtual routing and forwarding (VRF) which is a methodology introduced by the router sellers to assign different, independent and isolated routing tables in a router. Isolation is the essential characteristics of the VRF.

The VRF is the corner stone for services such as virtual private networks (VPN). In a VPN environment, several customers could have the same address space and the essential characteristic is that the different customer networks co-exist in a router and that they are isolated from one another. The mixing of address spaces of different networks to provide a main source and another one to back-up the routing information is not foreseen. In fact, this characteristic goes against the basic concept of the VPN based on VRF and the routing information must be made available in a redundant manner, traditional routing mechanisms are used.

DESCRIPTION OF THE INVENTION

To achieve the objectives and to solve the drawbacks indicated above, the invention provides a new method which is applied in hierarchical networks using the IPv6 version of the Internet Protocol (IP), in which the networks comprise a plurality of different autonomous systems (AS) functioning as providers and are made up of a set of nodes configured with operation patterns common and consistent with relation to a set of networks, such that the communication between each AS uses a border gateway routing protocol (BGP-4) in which the routing information for establishing information exchange session is calculated in a distributed manner by each of the nodes of the network by means of a first instance of routing protocol BGP-4.

The novelty of the method of the invention lies in the fact that it comprises the following phases:

introducing information in the routers of a first AS provider and of a second AS provider with which it has not established a connection previously and is located in a higher hierarchical level corresponding to the level of a third AS which is the main provider of the first AS, the second AS and the third AS having in turn a fourth AS provider common to both belonging to a level higher than the hierarchical level of the second AS and of the third AS; for establishing communication between the first AS and the second AS;

generating in the first AS a multi-provider service request to the second AS;

the second AS generates a request to the fourth AS so that it authorizes information exchange sessions;

the fourth AS generates two new and independent BGP-4 pairing sessions upon receiving an information exchange authorization;

the first BGP-4 session being a session established between the fourth AS and the second AS, and the second BGP-4 session being a session established between the second AS and the first AS;

the first AS, second AS and fourth AS establish an additional and independent BGP-4 session to send the new multi-provider information requested, generating an additional and independent routing table in the first AS, second AS, and fourth AS with a lower priority with respect to the main routing table conventionally provided in the routing protocol BGP-4, upon receiving a routing information, accessing the main table to establish the routing address to be followed, accessing an additional routing table when it is detected that the routing address received does not correspond with the routing established in said main table, using the routing address established in the additional table in the event of accessing said additional table, sending the established routing address to be followed obtained from the first table or from the second table, depending on whether the address has been obtained in the first or in the second table.

The invention is therefore based on the characteristics of the pairing sessions established in the BGP-4 protocol, pairing sessions being understood as the fact that two routers which are using the BGP-4 protocol having to know both the IP address and the identifier of the AS itself, the IP address and the identifier of the AS of the router with which they are exchanging routing information through the protocol.

Therefore, by means of the procedure described from the point of view of the first AS, it is possible to perform the multi-provider operation with the second AS and third AS using the address space received from the third AS. This involves a great simplification in the AS management, as well as in the range of services which can be made to the final AS thereof, because only an address space will have to be managed internally and the final AS thereof will also be in charge of a single address.

Additionally, any fault that occurred in the forward link between the first AS and the third AS will not be detected by the final AS located in a lower hierarchy since the traffic is directed between the first AS and the second AS by means of the routing protocol. Furthermore, even a fault in the forward link between the third AS is unnoticed by the AS customers of the first AS in virtue of the routing protocol.

This circumstance is not given in the current solutions because any fault in the forward link between the first AS and the third AS will isolate the first AS and the fourth AS from the rest of the infrastructure. In the event of a fault in the forward link of a fifth AS which is located in a hierarchical level corresponding to the level of the first AS, and the main provider of which is the third AS, said fifth AS will only be able to communicate with the third AS and the first AS.

From the point of view of the multi-provider made up of the second AS according to the described method of the invention, the second AS is allowed to start offering retail services to the first AS directly, unlike what is allowed today because any downwards AS is slave of the AS located in an upper level which is providing the Internet connectivity. For handling the main table and the additional table, according to the procedure described, it is anticipated that said main and additional table are determined by parallel routing information bases (RIB) of different priority, whereas the process of sending the routing address established is performed by means of a forwarding information base (FIB) favoring the routing information coming from the main table with respect to the additional table, such that by means of these databases and forwarding information the execution of the phases of the method indicated in a simplified manner is allowed since the use of FIB always favors the routing information coming from the Internet IPv6 (main table) over the routing information related with the multi-provider in the AS level (additional table parallel to the main table) using the additional table only when the link has disappeared in the main table due to a fault in the main links, therefore by means of using this mechanism, the AS which needs multi-provider only needs a delegation of addresses from an AS.

The invention optionally anticipates that besides the phases described above, new phases can be incorporated for establishing a second redundant communication path between the first AS and the third AS, and a second communication path between the third AS and the fourth AS which consist of:

generating in the first AS a multi-provider service request to the third AS;

generating in the third provider a request to the fourth provider so that it authorizes information exchange sessions;

the fourth AS generates two new and independent BGP-4 pairing sessions upon receiving an information exchange authorization;

the first BGP-4 session being a session established between the fourth AS and the third provider, and the second BGP-4 session being a session established between the third AS and the first AS;

the first AS, third AS and fourth AS establish an additional and independent BGP-4 session for sending the new multi-provider information requested;

generating an additional independent routing table in the first AS, third AS and fourth AS with a lower priority with respect to the main routing table conventionally provided in the routing protocol BGP-4, upon receiving a routing information, accessing the main table to establish the routing address to be followed, accessing the additional routing table when it is detected that the routing information received corresponds with the routing established in said main table;

using the routing address established in the additional table in the event of accessing said additional table, sending the established routing address to be followed obtained from the first table or from the second table, depending on whether the address has been obtained in the first or in the second table.

Therefore, by means of these optional phases a second communication path is established between the first AS with the third AS and a second communication path of the third AS with the fourth AS which make up a redundant communication in the event that it is required.

To facilitate a better understanding of this specification, a series of drawings forming an integral part thereof in which the object of the invention has been depicted with illustrative and non-limiting character are attached below.

DESCRIPTION OF A PREFERRED EMBODIMENT

The invention is described below based on the aforementioned figures.

Figure 1:
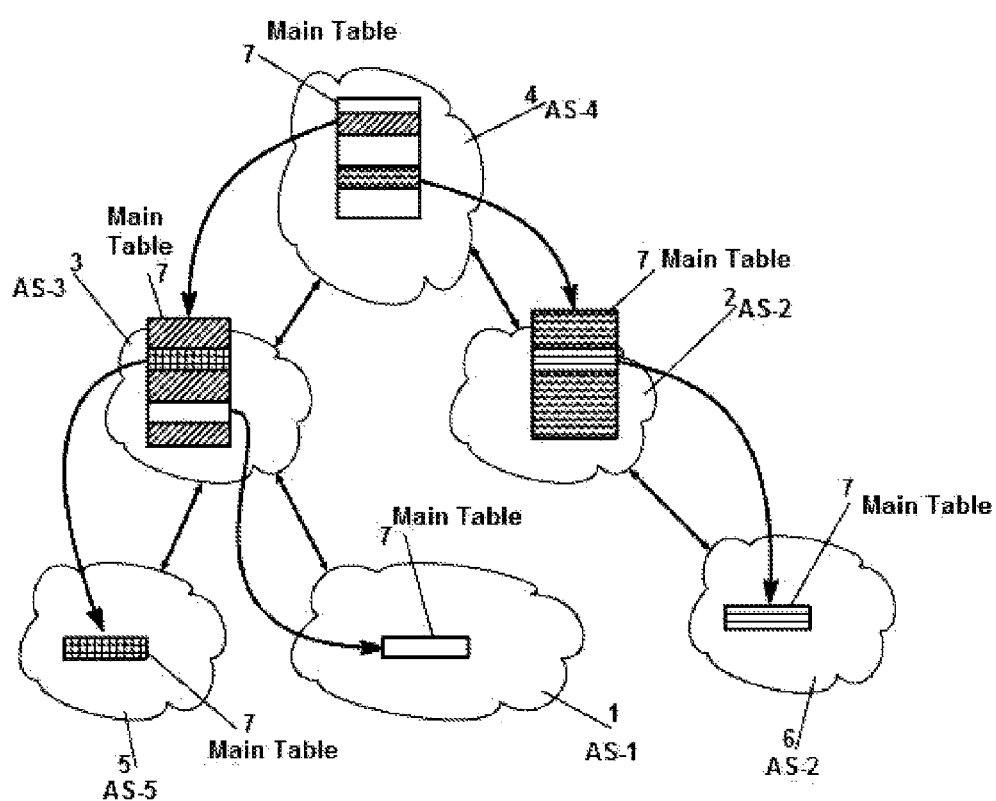
FIG. 1 shows a schematic view of a hierarchical Internet protocol network in IPv6 version such as anticipated in the state of the art in which the multi-provider service is not allowed.

FIG. 1 shows a schematic depiction of an infrastructure for hierarchical routing such as Internet IPv6.

The depiction of the clouds referred to with the numbers 1 to 6 represent independent routing domains, i.e., autonomous systems (AS) which were described in the Background of the Invention section. The rectangles 7 represent the tables containing the routing information which is available in each AS 1-6, and which in the invention are called main tables 7, the double arrows represent the routing information exchange sessions which are established between the AS 1-6 to exchange the routing information according to the hierarchy established by the IPv6, whereas the simple arrow lines indicate the delegation of addresses which takes place in the different BGP-4 sessions. This delegation of addresses is depicted by means of different marked areas in the main memories 7 and they represent the different ranges of addresses of the hierarchy which are delegated in the AS of the lowest level, in which the same type of marking has been depicted.

In this environment, there is a first AS1 by means of which there is no communication with a second AS2 and therefore routing information exchange sessions cannot exist between the same, which does not allow offering a multi-provider service to the first AS 1.

In this environment, at the same hierarchical level as the second AS 2 there is a third AS 3, and in a level higher than both there is a fourth AS 4. At the same level as the first AS 1 there is a fifth AS 5 and a sixth AS 6.

In this configuration the fourth AS 4 exchanges information with its customers, the second AS 2 and the third AS 3. The third AS 3 in turn exchanges information with its provider, the fourth AS 4, and with its customers, the first AS 1 and the fifth AS 5, and so on for the case in which a greater number of ASs will be represented. The second AS2 exchanges routing information with its provider, the fourth AS1 and with its customer, the sixth AS 6. In this case when a fault happens in the forward link, i.e., the link with its provider, any AS1-6 and all their clients from the rest of the routing infrastructure dependent on them will be isolated from the infrastructure, since there is no possibility of the multi-provider service.

Figure 2:
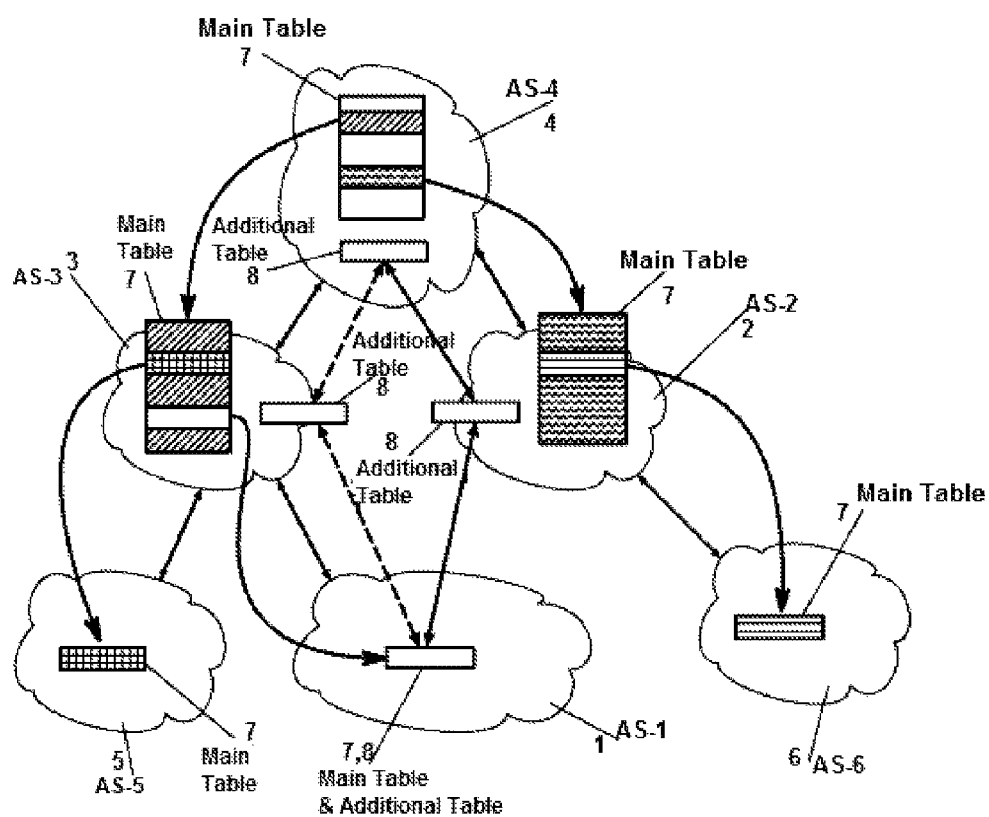
FIG. 2 shows a figure similar to the previous figure, but in which the method of the invention has been applied to allow the multi-provider service in the first AS. This figure shows the option which establishes redundant communication between the first AS with the third AS, and between the third AS with the fourth AS by means of dashed lines.

To prevent this drawback, the invention provides a new method to allow the multi-provider service, as shown in FIG. 2.

The new method comprises a first phase in which information is introduced in the routers of the first AS1 and of the second AS2 with which it has not established a connection previously and is located at a higher hierarchical level to allow establishing communication between the first AS 1 and the second AS 2.

This information is introduced in the routers by means of programming the BGP-4 protocol operation by means of which the AS are conventionally communicated. This information indicates to the routers to which AS they belong and with which router and from which AS the session is established, since only activating the BGP-4 protocol is not enough because the latter cannot discover with whom he needs to speak to if it is not specified as has been described, because the BGP-4 has no means for discovering a neighbor and it never establishes routing sessions automatically, but rather they are established explicitly and when necessary between two specific routers which are configured to that end by the operators.

Next, the method comprises generating in the first AS1 a multi-provider service request to the second AS 2, such that when the latter receives it, it generates a request to the fourth AS provider 4 so that it authorizes information exchange sessions, such that if the fourth AS 4 authorizes the information exchange two new and independent BGP-4 pairing sessions are generated. The first BGP-4 session is a session which is established between the fourth AS 4 and the second AS 2, whereas the second BGP-4 session is established between the second AS 2 and the first AS 1.

An additional and independent BGP-4 session is then established by the first AS1, second AS2 and fourth AS4 to send the new multi-provider information requested, and an additional and independent routing table 8 is generated in the first AS1, second AS2 and fourth AS4 with a lower priority with respect to the main routing table 7 conventionally provided in the routing protocol BGP-4.

These characteristics allow upon receiving a routing information, accessing the main table 7 to establish the routing address to be followed, such that when it is detected that the routing address received does not correspond with the routing established in said main table 7, the additional routing table 8 is accessed in which case the routing address established in said additional table 8 is used. This circumstance is depicted by means of module 9 of FIG. 3.

Figure 3:
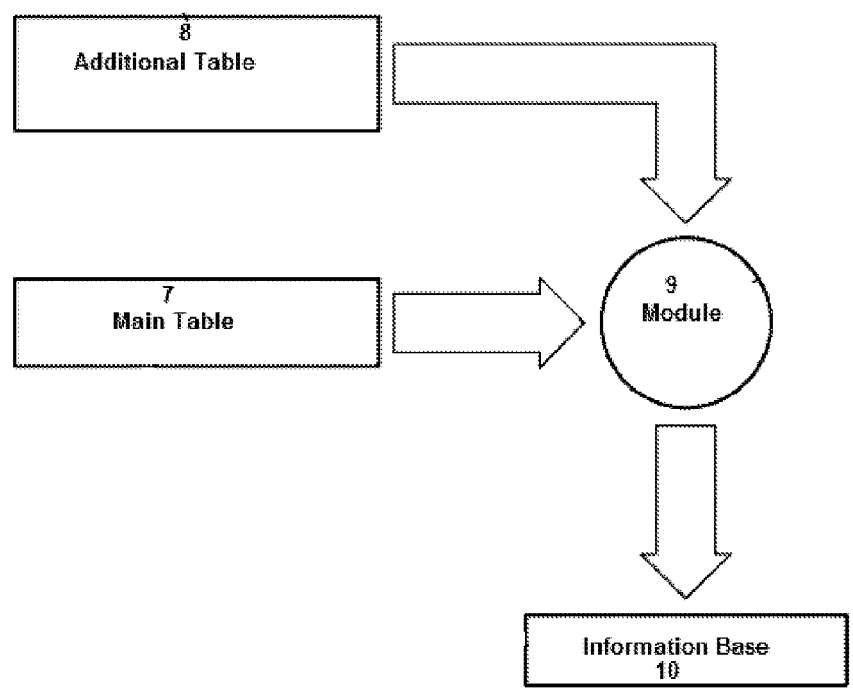
FIG. 3 shows a schematic depiction of an implementation of the main table and the additional table by means of using parallel routing information bases (RIB) which is handled by means of a forwarding information base (FIB).

To perform this functionality, the invention uses the concept of parallel routing information bases (RIB) 7 and 8 to allow the implementation of multi-provider in the AS level in highly hierarchical routing environments such as Internet IPv6. In this case the routing information related with routing of the IPv6 is managed using the BGP-4 protocol as indicated by the standards, whereas the routing information related with the multi-provider in the AS level are managed in the additional separated isolated routing table 8 and by means of an instance separated and isolated from the routing protocol BGP-4. Therefore, both instances keep and maintain their own routing table as shown in FIG. 3.

Next, the information is sent according to the routing address established, the sending of which is carried out by means of a forwarding information base FIB 10 consolidated from the RIB, which always favors the routing information coming from the Internet IPv6 depicted by means of the main table 7 over the routing information related with the multi-provider in the AS level, referred to with the additional table 8, using the additional table 8 only when the routing address has disappeared in the main table 7 due to a fault in the main links. By means of using this mechanism, the AS which needs a multi-provider only needs a delegation of addresses from an AS.

Therefore, the BGP-4 session multi-provider is only compulsory when the prefix delegated to AS in multi-provider is not transmitted by means of the standard BGP-4 session. Given that the third AS 3 delegates the address space in the first AS 1 this routing information is present in standard BGP-4 table and the information received through the multi-provider session will be overwritten. This is not the case for the second AS 2, which is not allowed to announce the routing information from the first AS 1 to the main routing table 7 due to the current standards, therefore the implementation of the routing prioritization mechanism will not be affected by the presence or absence of the path of the routing protocol (optional); the latter always uses a first main RIB prefix in table 7 and the parallel RIB prefixes 8 are diverted only when no routing entry is found in the search process.

FIG. 2 shows the option in which in addition to establishing the sessions indicated above, redundant sessions are also established between the first AS 1 and the third AS 3 at the same time as the latter establishes a redundant session with the fourth AS 4, to that end the method incorporates the following phases:

generating in the first AS 1 a multi-provider service request to the third AS 3, to then generate in the third AS 3 a request to the fourth AS 4 so that it authorizes information exchange sessions, two new and independent BGP-4 pairing sessions being generated by the fourth AS upon receiving an information exchange authorization. The first session is a session established between the fourth AS 4 and the third AS 3, whereby the second BGP-4 session is a session established between the third AS 3 and the first AS 1.

Next, an additional and independent BGP-4 session is established by the first AS 1, third AS 3 and fourth AS 4 to send the new multi-provider information requested. An independent and additional routing table is then generated in the first AS, third AS 3 and fourth AS 4 with a lower priority with respect to the main routing table conventionally provided in the routing protocol BGP-4.

This allows upon receiving a routing information, accessing the main table to establish the routing address to be followed, and accessing the additional routing table when it is detected that the routing address received does not correspond with the routing established in said main table.

Finally, the routing address established in the additional table is used in the event that the same has been accessed in a manner similar to that which was described for the essential phases of the method described above, and the routing address established to be followed obtained in the first or in the additional table is sent according to the description made.

From a practical point of view, the invention can be implemented by means of a modified BGP-4 routing daemon on a Linux platform, which implements a prioritized RIB mechanism that allows executing the phases described.

The solution proposed follows the same steps as the implementation of the standard BGP-4 sessions, and the additional parameters that need to be included in the configuration are the RIB used by the modified BGP-4 daemon and the TCP port used by the modified BGP-4 session. It must be highlighted that this port must be different from the standard TCP 179 port used for the BGP-4 implementations to allow the coexistence of the standard and modified pairing sessions.

Another possibility of implementation of the invention comes from the possibility of defining a new set of multi-protocol BGP-4 (mpBGP) capacities which is an option allowed by BGP-4 protocol for transporting routing information which is not IP in the stricter sense. In this case performing the routing information exchange for families of special addresses, such as for example those used in the IPv6 networks is required such that the routing information IPv6 multi-provider can be exchanged by means of the mpBGP using a new family of addresses defined for this purpose. The main requirement in this arrangement is for the BGP-4 routing daemon to be able to handle the prioritized RIB.

The invention claimed is:

1. A method for distributing routing information for redundant connections, applicable in hierarchical Internet protocol networks (IP version IPv6) comprising a plurality of different autonomous systems (AS) functioning as providers and comprising a set of nodes configured with operation patterns common and consistent with relation to a set of networks, a border gateway routing protocol (BGP-4) being used in communication between each AS by which the routing information is calculated in a distributed manner by each of the nodes of the network by a first instance of the BGP-4 to establish information exchange sessions, the method comprising:

introducing information in routers of a first AS and a second AS with which the first AS has not established a connection previously and that is located in a higher hierarchical level corresponding to a hierarchical level of a third AS which is a main provider of the first AS, the second AS and the third AS having in turn a fourth AS provider common to both belonging to a higher hierarchical level than the hierarchical level of the second AS and third AS, for establishing communication between the first AS and the second AS;

generating in the first AS a multi-provider service request to the second AS;

generating in the second AS a request to the fourth AS to authorize an information exchange session;

in response to receiving the request to authorize the information exchange session, the fourth AS generating two new and independent BGP-4 pairing sessions comprising a session established between the fourth AS and the second AS and a session established between the second AS and the first AS;

the first AS, second AS, and fourth AS establishing an additional and independent BGP-4 session to send new multi-provider information in response to the multi-provider service request;

generating an additional routing table in the first AS, the second AS, and the fourth AS with a lower priority with respect to a main routing table provided in the BGP-4;

in response to receiving routing information, accessing the main routing table to determine a main routing table routing address;

in response to determining that the received routing information corresponds to the main routing table routing address, determining that the main routing table routing address is a routing address to be followed;

in response to determining that the received routing information does not correspond to the main routing table routing address, accessing the additional routing table to determine an additional routing table routing address to use as the routing address to be followed; and sending the routing address to be followed, wherein the main routing table and the additional routing table are determined by parallel routing information bases (RIB) of different priority, and the routing address to be followed is being sent by a forwarding information base (FIB) favoring the routing information coming from the main routing table with respect to that from the additional routing table.

2. A method for distributing routing information for redundant connections, applicable in hierarchical Internet protocol networks (IP version IPv6) comprising a plurality of different autonomous systems (AS) functioning as providers and comprising a set of nodes configured with operation patterns common and consistent with relation to a set of networks, a border gateway routing protocol (BGP-4) being used in communication between each AS by which the routing information is calculated in a distributed manner by each of the nodes of the network by a first instance of the BGP-4 to establish information exchange sessions, the method comprising:

introducing information in routers of a first AS and a second AS with which the first AS has not established a connection previously and that is located in a higher hierarchical level corresponding to a hierarchical level of a third AS which is a main provider of the first AS, the second AS and the third AS having in turn a fourth AS provider common to both belonging to a higher hierarchical level than the hierarchical level of the second AS and third AS, for establishing communication between the first AS and the second AS;

generating in the first AS a multi-provider service request to the second AS;

generating in the second AS a request to the fourth AS to authorize an information exchange session;

in response to receiving the request to authorize the information exchange session, the fourth AS generating two new and independent BGP-4 pairing sessions comprising a session established between the fourth AS and the second AS and a session established between the second AS and the first AS;

the first AS, second AS, and fourth AS establishing an additional and independent BGP-4 session to send new multi-provider information in response to the multi-provider service request;

generating an additional routing table in the first AS, the second AS, and the fourth AS with a lower priority with respect to a main routing table provided in the BGP-4;

in response to receiving routing information, accessing the main routing table to determine a main routing table routing address;

in response to determining that the received routing information corresponds to the main routing table routing address, determining that the main routing table routing address is a routing address to be followed;

in response to determining that the received routing information does not correspond to the main routing table routing address, accessing the additional routing table to determine an additional routing table routing address to use as the routing address to be followed; and sending the routing address to be followed, wherein:

the first AS generates a multi-provider service request to the third AS;

the third AS generates a request to the fourth AS to authorize an information exchange session, in response to receiving the request to authorize the information exchange session, the fourth AS generates two new and independent BGP-4 pairing sessions comprising a session established between the fourth AS and the third AS and a session established between the third AS and the first AS;

the first AS, the third AS, and the fourth AS establish an additional and independent BGP-4 session to send new multi-provider information in response to the multi-provider service request;

an additional routing table is generated in the first AS, the third AS, and the fourth AS with a lower priority with respect to the main routing table provided in the BGP-4;

in response to receiving the routing information, the main routing table is accessed to determine the main routing table routing address;

in response to determining that the received routing information corresponds to the main routing table routing address, the main routing table routing address is determined to be the routing address to be followed;

in response to determining that the received routing information does not correspond to the main routing table routing address, the additional routing table is accessed to determine the additional routing table routing address to use as the routing address to be followed; and the routing address to be followed is sent.

* * * * *